(12) United States Patent
Koch et al.

(10) Patent No.: US 12,106,174 B2
(45) Date of Patent: Oct. 1, 2024

(54) SYSTEM AND METHODS FOR ENHANCING PORTAL DIRECTIONALITY DETERMINATION

(71) Applicant: ZEBRA TECHNOLOGIES CORPORATION, Lincolnshire, IL (US)

(72) Inventors: Michael J. Koch, Saint James, NY (US); Sajan Wilfred, Kollam (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/115,577

(22) Filed: Feb. 28, 2023

(65) Prior Publication Data

US 2024/0289568 A1 Aug. 29, 2024

(51) Int. Cl.
*G06K 7/10* (2006.01)
*G06Q 10/08* (2023.01)

(52) U.S. Cl.
CPC ......... *G06K 7/10475* (2013.01); *G06Q 10/08* (2013.01)

(58) Field of Classification Search
CPC ........................... G06K 7/10475; G06Q 10/08
USPC ........................................................ 235/440
See application file for complete search history.

(56) References Cited

U.S. PATENT DOCUMENTS

2013/0233922 A1* 9/2013 Schoening ..... G06Q 10/063114
235/385

* cited by examiner

*Primary Examiner* — Daniel A Hess

(57) ABSTRACT

The disclosure is a system comprising a transceiver array, containing at least a first pair of transceivers and a second pair of transceivers, the first pair of transceivers containing a transceiver that is included in the second pair of transceivers. Each transceiver in a pair is configured to monitor a plurality of zones for RFID tags, transmit information related to the monitoring of a portion the plurality of zones for RFID tags to the other transceiver in the pair, and determine a location of a monitored RFID tag based on the information acquired through the monitoring of the plurality of zones and the information received from the other transceiver in the first or second pair.

14 Claims, 5 Drawing Sheets

US 12,106,174 B2

SYSTEM AND METHODS FOR ENHANCING PORTAL DIRECTIONALITY DETERMINATION

BACKGROUND

Transceivers configured to function as overhead radio-frequency identification ("RFID") tag readers are often used to determine the location of an RFID tag in commercial environments, such as in warehouses or distribution centers. In these environments, an array of overhead RFID tag readers is often used to determine the bearing (angle of arrival) and to determine a location of an RFID tag. This is generally accomplished by an RFID tag reader using beam steering technology to determine the bearing of a tag, and the array of tag readers then determines the precise location of a tag using triangulation of multiple bearings from multiple tag readers that possess coverage overlap. However, deploying such an array in some instances may result in high costs to achieve monitoring of RFID tags in potentially a limited amount of space, such as along the pathways in a distribution center in which objects with RFID tags are commonly loaded from inside the distribution center onto trucks for shipping via a dock door. Such dock doors are commonly laid out in a row over the length of an exterior loading dock.

In such commercial environments, the exact location of an asset with an RFID tag within a facility may not be as important as determining if an asset has entered or left a point of ingress or egress, such as a portal. In such instances, the directionality of the tag, an estimate of the tag's position over time at the point of ingress or egress, and creating an auditable trail of an asset, may be of much higher value.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
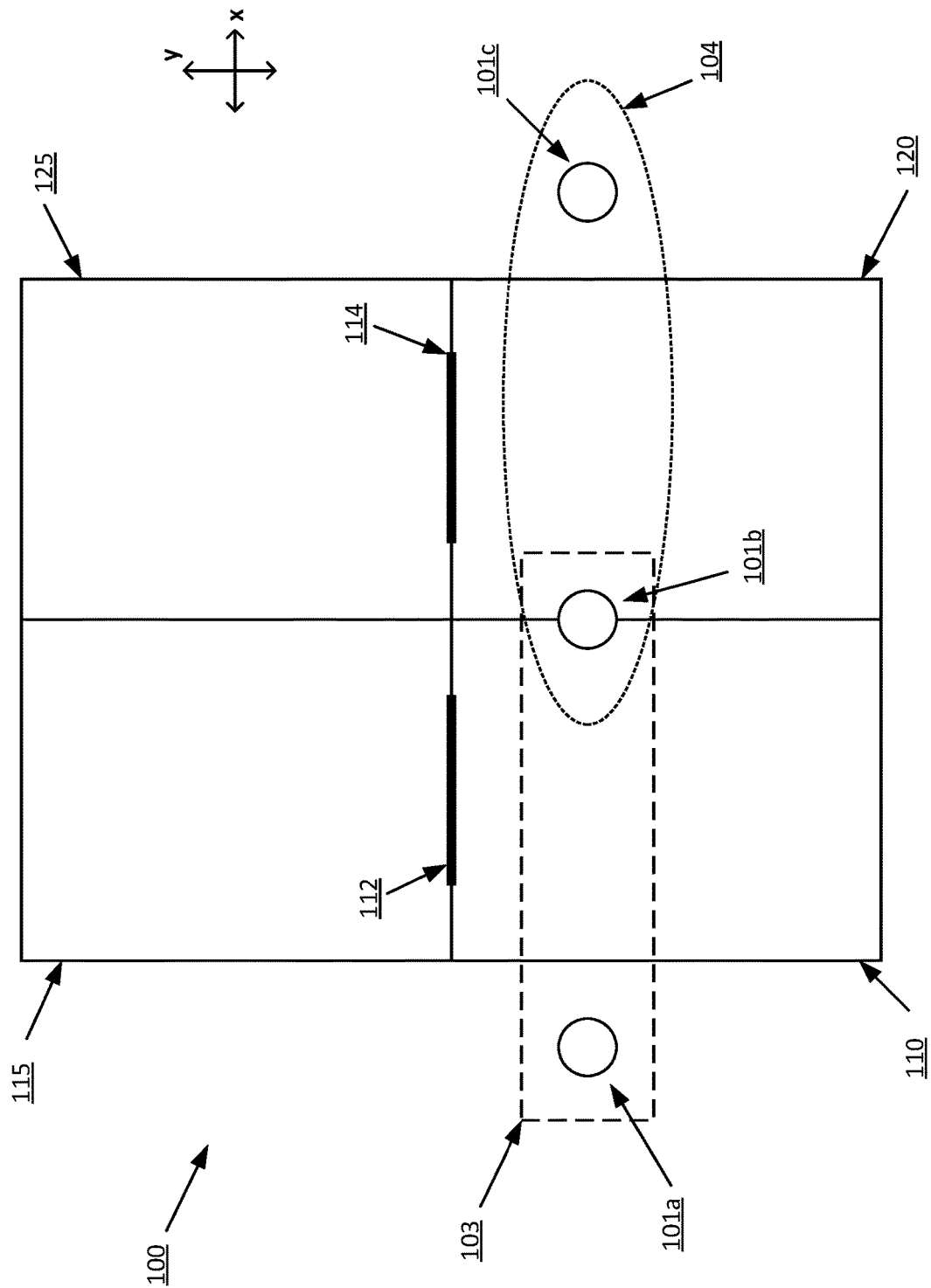
FIG. 1 is a diagram illustrating an overhead view of an example embodiment of the system of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In environments such as warehouses and distribution centers, an accurate determination of the directionality of an RFID tag at a point of ingress or egress, such as a portal, allows for accurate tracking of the asset to which the RFID tag is attached, which may be important for inventory or loss prevention uses. In many environments, a cluster of multiple RFID tag readers is implemented to obtain multiple bearing estimates for an individual tag and to triangulate a location and thus direction over time over the entire area of the cluster. The deployment of such a cluster can have high associated costs with its installation and operation, while providing little valuable information as to the directionality of an RFID tag at an ingress or egress point. A system which overcomes these disadvantages is provided, for example, by utilizing a single overhead transceiver functioning as an RFID tag reader to monitor two portals, including monitoring RFID tags coming and going from a warehouse out of two separate dock doors, while having an overlap in monitoring coverage for each portal with at least one other transceiver, forming its own localized cluster.

Examples disclosed herein are directed to a system, comprising: a linear transceiver array, containing at least a first pair of transceivers and a second pair of transceivers, the first pair of transceivers containing a transceiver that is included in the second pair of transceivers, wherein each transceiver in a pair is configured to monitor a plurality of zones for RFID tags, including at least a first zone and a second zone, each with a defined zone width, where a first portal is located at a boundary between the first zone and second zone, and including at least a third zone and a fourth zone, where a second portal is located at a boundary between the third zone and fourth zone; transmit information related to the monitoring of a portion of the plurality of zones for RFID tags to the other transceiver in the pair; and determine a location of a monitored RFID tag based on the information acquired through the monitoring of the plurality of zones and the information received from the other transceiver in the first or second pair, such that the first pair of transceivers cooperates to monitor and determine locations for RFID tags in the first zone and the second zone, and the second pair of transceivers cooperates to monitor and determine locations for RFID tags in the third zone and the fourth zone.

FIG. 1 illustrates an overhead view of an example embodiment of a system of the present disclosure. A system 100 comprises a transceiver array 101*a-c*, which includes at least a first pair of transceivers 103 and a second pair of transceivers 104. The first pair of transceivers 103 includes a transceiver 101*b* that is also included in the second pair of transceivers 104. For example, a first pair of transceivers 103 may include transceiver 101*a* and transceiver 101*b*, and a second pair of transceivers 104 may include transceiver 101*b* and transceiver 101*c*. Each transceiver 101*a-c* may be an overhead RFID tag reader, such as a beam steerable phased array RFID reader. Although the transceivers in the array 101*a-c* may be positioned in any arrangement that allows for acceptable coverage over the relevant coverage area for which directionality of RFID tags is of interest, the advantages of the present disclosure are generally greatest when the transceivers in the array are positioned in a linear arrangement. Additionally, the transceivers in the array may be deployed at ground level or in any other position that allows for acceptable coverage over the relevant coverage area for which directionality of RFID tags is of interest.

Each transceiver in the first pair 103 or the second pair 104 is configured to monitor a plurality of zones for RFID tags. The illustration of an example embodiment of the system 100 in FIG. 1 includes illustrating this monitoring of the plurality of zones with regard to transceiver 101b, which is included in the first pair 103 and second pair 104 of transceivers, as an example of the monitoring capabilities of any given transceiver in the system. The plurality of zones includes a first zone 110 and a second zone 115. A first portal 112 is located at the boundary between the first zone 110 and second zone 115. Each transceiver is also configured to monitor at least a third zone and a fourth zone, for example as shown in FIG. 1 transceiver 101b, in the first pair 103 or the second pair 104 is also configured to monitor at least a third zone 120 and a fourth zone 125. A second portal 114 is located at the boundary between the third zone 120 and fourth zone 125. The first zone 110, second zone 115, third zone 120, and fourth zone 125 may each have a zone width defined in the settings of the transceivers 101a-c, which may be coordinated among the transceivers 101a-c in the system 100.

The first portal 112 and second portal 114 may be, for example, docks doors through which items containing RFID tags pass through as they are being loaded from a warehouse to a truck for shipment or vice versa. Each transceiver 101a-c may be positioned at a predetermined height above the zones which they monitor. In a system of the present disclosure, the number of transceivers required may depend on the number of portals or points of ingress/egress for which directionality of RFID tags is a concern. For example, to monitor zones associated with ten different portals, such as dock doors in a row, at least eleven transceivers may be required, as each transceiver may be configured to monitor zones associated with two portals.

Each transceiver in the first pair 103 or the second pair 104 is also configured to transmit information related to the monitoring of a portion of the plurality of zones for RFID tags to the other transceiver in the pair. For example, regarding the first pair of transceivers 103, transceiver 101b may be configured to monitor a first zone 110, second zone 115, third zone 120, and fourth zone 125 for RFID tags. Transceiver 101a may also be configured to monitor the first zone 110 and second zone 115 for RFID tags as well as two additional zones which are not monitored by transceiver 101b (not shown). Transceiver 101b may transmit information to transceiver 101a, which may include information pertaining to the location and directionality of RFID tags in the first zone 110 and second zone 115 that are monitored by both transceivers 101a, 101b in the first pair 103. In an example embodiment of the present disclosure, transceiver 101b may be configured to transmit bearing information related to an RFID tag that is identified in the first zone 110 to transceiver 101a.

Each transceiver in the first pair 103 or the second pair 104 is configured to determine a location of an RFID tag in a monitored zone 110, 115, 120, 125 based on the information acquired through the monitoring of the plurality of zones and the information received from the other transceiver in the first or second pair 103, 104. For example, an RFID tag may enter the first zone 110, and each transceiver in the first pair 103 may identify the RFID tag. Transceiver 101b may estimate an x-y position, according to the coordinate plane shown in FIG. 1, of the RFID tag, using the bearing information related to the RFID tag while assuming a fixed height of the RFID tag from the ground. In areas of ingress or egress, such as near a portal, transceiver 101b can use this position information to determine that the RFID tag moved from the first zone 110, through the first portal 112, and into the second zone 115. Transceiver 101a may estimate the bearing of the same RFID tag that entered into the first zone 110 or second zone 115, and transceiver 101a may transmit this bearing estimation and/or position information to the other transceiver in the first pair 103, transceiver 101b. Transceiver 101b may use the information it receives from transceiver 101a in conjunction with its own estimations to determine a more accurate location/direction of the RFID tag. This results in a system 100 in which the first pair of transceivers 103 cooperates to monitor and determine bearing information for RFID tags in the first zone 110 and the second zone 115, and the second pair of transceivers 104 cooperates to monitor and determine bearing information for RFID tags in the third zone 120 and the fourth zone 125.

By utilizing the bearing information received from transceiver 101a, transceiver 101b may determine a more accurate position of an RFID tag, and thus a more accurate direction of an RFID tag moving through a portal separating two zones, e.g., the first portal 112. The physical separation between the transceivers in a pair improves the diversity of the read by providing a bearing estimate from two different positions (one from each transceiver in a pair). By estimating the location from the bearing information shared among multiple readers, the accuracy of the tag location determination is improved as well as the ability to read tags in cases where one reader of the pair covering a common zone fails to read a tag and the other transceiver in the pair reads the tag. This improved accuracy in location estimation leads to improved accuracy in directionality determination, which may enhance the accuracy of RFID tag tracking systems, for example systems used where an auditable trail is required for inventory and loss prevention purposes.

This improved location estimation, resulting from readers that monitor common zones sharing information regarding the monitoring between each other, leading to an enhanced directionality determination. Each transceiver in every pair of transceivers, for example, the first pair of transceivers 103, is required to actively monitor every zone of which it is capable, for example, regarding transceiver 101b, the first zone 110, second zone 115, third zone 120, and fourth zone 125. This monitoring in combination with the time required to transmit information relating to a commonly monitored zones to the other transceiver in a pair results in an increased computation time for determining an improved location and directionality.

Figure 2:
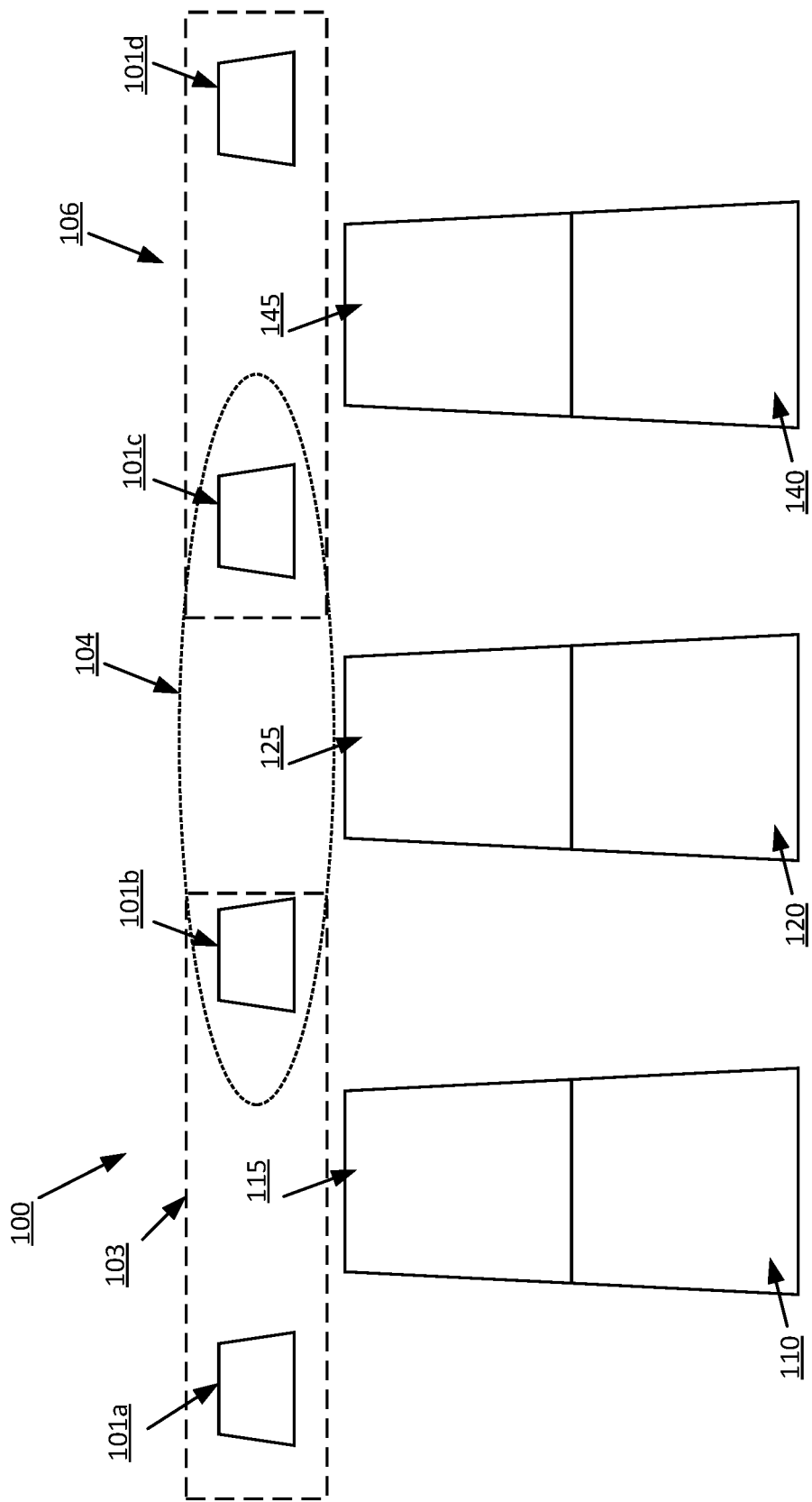
FIG. 2 is a diagram of an example embodiment of the system of the present disclosure illustrating a linear arrangement of overhead transceivers along a row of portals.

FIG. 2 illustrates an example embodiment of a system of the present disclosure. Each pair of transceivers may cooperate in the monitoring of common zones with each transceiver in a pair sharing information related to this monitoring to the other transceiver in the pair. For example, a system 100 may include a first pair of transceivers 103, including transceiver 101a and transceiver 101b; a second pair of transceivers 104, including transceiver 101b and 101c; and, a third pair of transceivers 106, including transceiver 101c and 101d. Transceiver 101a may be configured to monitor the first zone 110, the second zone 115, and two additional zones (not shown). Transceiver 101b may be configured to monitor the first zone 110, second zone 115, third zone 120, and fourth zone 125. Transceiver 101c may be configured to monitor the third zone 120, the fourth zone 125, zone 140, and zone 145. Transceiver 101d may be configured to monitor zone 140, zone 145, and two additional zones (not shown). Transceiver 101b may send information regarding its monitoring of the first zone 110 and the second zone 115 to transceiver 101a and information regarding its monitoring of the third zone 120 and fourth zone 125 to transceiver 101c.

Likewise, each transceiver in each pair in the system 100 may communicate with the other transceiver in the pair regarding of commonly monitored zones. For example, transceiver 101c may send information regarding its monitoring of the third zone 120 and the fourth zone 125 to transceiver 101b and information regarding its monitoring of zone 140 and fourth zone 145 to transceiver 101d.

Figure 3:
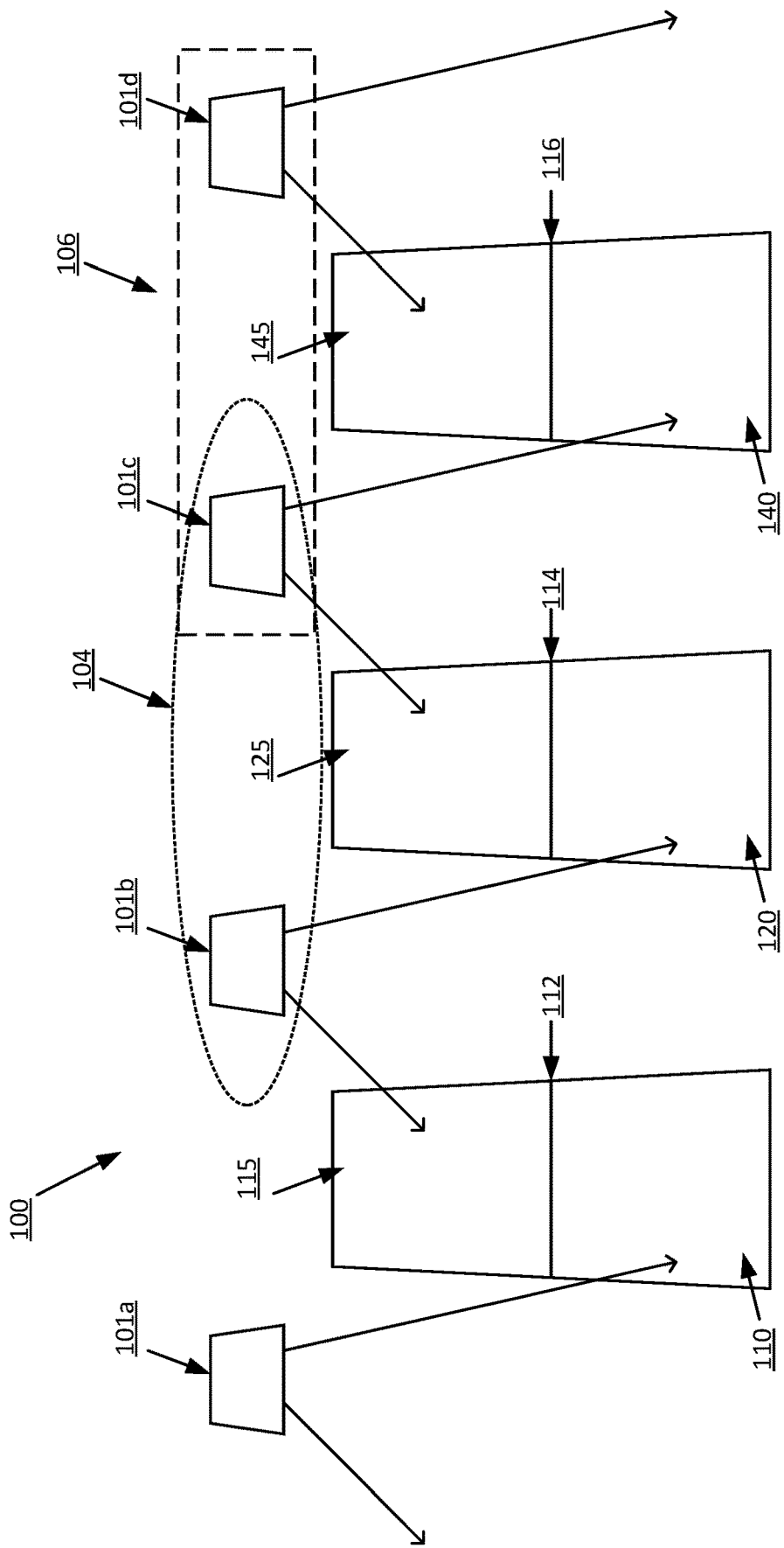
FIG. 3 is a diagram of an example embodiment of the system of the present disclosure illustrating a linear arrangement of overhead transceivers along a row of portals.

FIG. 3 illustrates an example embodiment of a system of the present disclosure. In a system 100, each pair of transceivers may synchronize in time and partition the monitoring of a common zone between the transceivers in the pair. For example, the second pair of transceivers 104, which includes transceiver 101b, having the capability to monitor the first zone 110, the second zone 115, the third zone 120, and the fourth zone 125, and transceiver 101c, having the capability to monitor the third zone 120, the fourth zone 125, and two additional zones 140 and 145, may synchronize in time and partition the monitoring of commonly monitored zones, e.g. the third zone 120 and fourth zone 125, between transceiver 101b and transceiver 101c. As shown in FIG. 3, the second pair of transceivers 104 may partition the monitoring in such a way that transceiver 101b is configured to monitor the third zone 120 and transceiver 101c is configured to monitor the fourth zone 125, wherein an arrow extending out from a transceiver 101a-d to a zone represents that specific transceiver's coverage zones or zones where that transceiver monitors for RFID tags. In addition to coordinating with transceiver 101b to monitor common zones, transceiver 101c may also be included in a third pair of transceivers 106, wherein transceiver 101c coordinates with transceiver 101d to monitor common zones 140, 145 and a third portal 116 serves as a boundary between zone 140 and zone 145. In a system 100 implemented in an environment that experiences a high volume of RFID tags passing through multiple portals at a relatively high speed, such as a warehouse with a row of dock doors used to load and unload items at the warehouse, the partitioning of the common zones may lead to more optimized and current coverage over the overall pathway.

For example, the second pair of transceivers 104 may synchronize in time, such that the transceivers 101b, 101c, begin monitoring at the same time to determine an accurate bearing and direction estimate over time. The second pair of transceivers 104 may also partition the monitoring in such a way that transceiver 101b is configured to monitor the third zone 120 and transceiver 101c is configured to monitor the fourth zone 125. If an RFID tag enters the third zone 120, transceiver 101b may detect the tag and transmit information pertaining to this detection to transceiver 101c. Synchronized transceiver 101c may then confirm that the tag is not in the fourth zone 125 and may subsequently report the tag's location and direction to a remote host (not shown). If the RFID tag moves from the third zone 120, through the second portal 114, and into the fourth zone, transceiver 101c may then detect the tag, and based on the information it received from transceiver 101b, transceiver 101c may subsequently report the tag's location and accurate direction with confidence to a remote host (not shown). In instances where the system 100 monitors directionality of a tag, current zone occupancy is important to determining an accurate direction estimation. The sharing of information between a pair of transceivers monitoring partitioned common zones advantageously allows for the rapid confirmation of zone occupancy and over time, rapid confirmation of direction, of an RFID tag in scenarios where a large volume of tags moves along the pathway at a high speed.

In some RFID tracking applications, such as tracking RFID tags near points of ingress or egress, the precise location of the tagged asset is not what the end user needs to accurately and timely track its assets. End users in such applications may benefit from knowing the directionality of the tag—knowing whether a transition has happened between two zones of interest. If a transition is detected by a monitoring transceiver, the transceiver may report the transition with information on source and destination zone to the other transceiver in the pair capable of monitoring common zones and/or to a remote host (not shown). In some cases it may be important to detect the transition as soon as possible. For example, the case of a forklift moving into a wrong trailer needs to be detected as soon as possible so that a feedback may be given to the driver before the driver loads or unloads or items from the incorrect truck. By partitioning the areas of coverage between the two adjacent transceivers, configured to be included in a pair that monitors common zones, there is low or no overlap of monitoring by the two readers, which results in an improved timeliness to detect transition.

Figure 4:
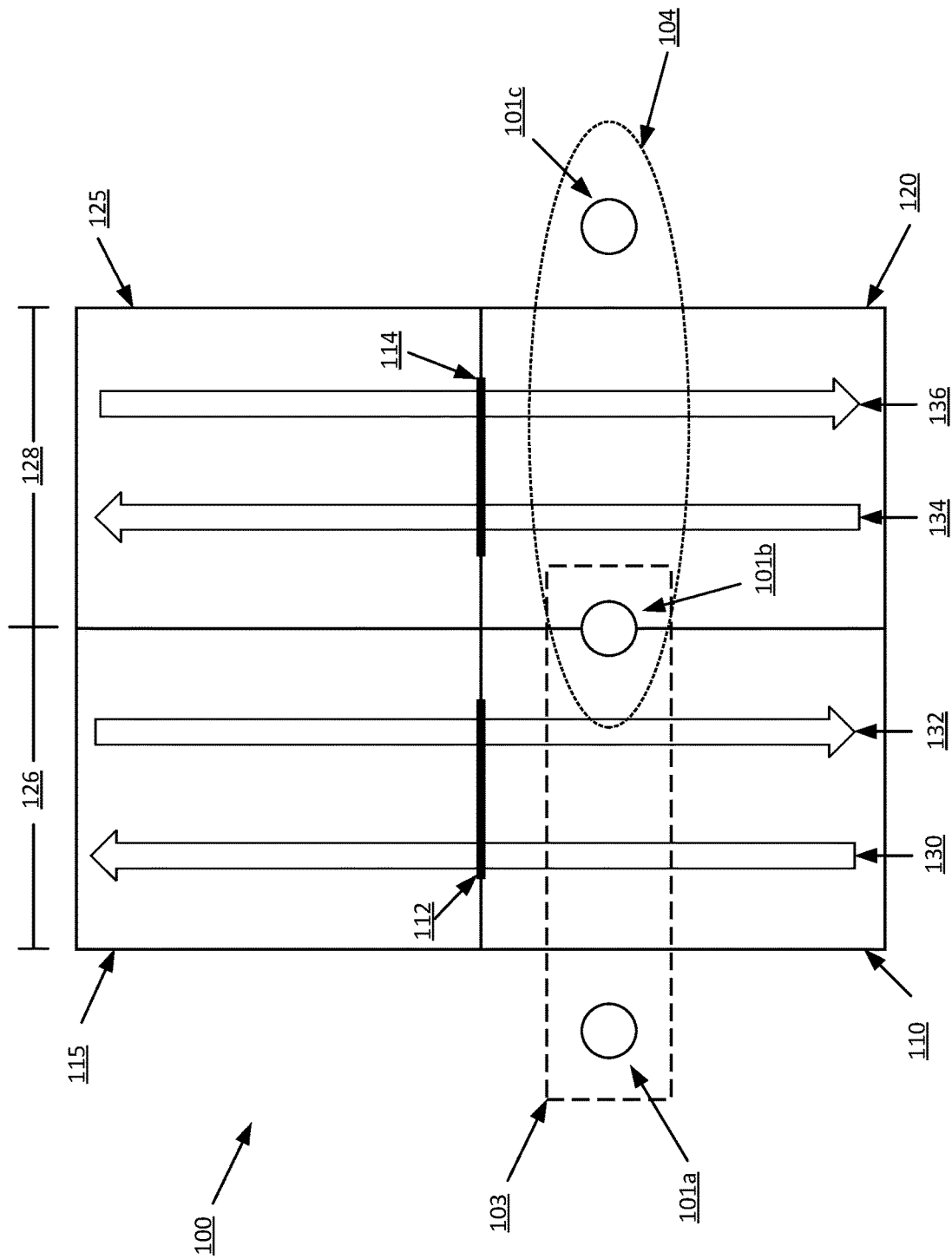
FIG. 4 is a diagram showing an overhead view of an example embodiment of the system of the present disclosure.

FIG. 4 illustrates an overhead view of an additional embodiment of the present disclosure. A system 100 may include at least a first pair of transceivers 103 and a second pair of transceivers 104. The first pair of transceivers 103 includes a transceiver 101b that is also included in the second pair of transceivers 104. Each transceiver may be configured to monitor a first lane 126, which extends in a first direction 130 from the first zone 110 to the second zone 115 and in a second direction 132 from the second zone 115 to the first zone 110. The first lane 126 may extend through the first portal 112. Each transceiver, e.g. transceiver 101b in FIG. 3, may also be configured to monitor a second lane 128, which extends in a third direction 134 from the third zone 120 to the fourth zone 125, and in a fourth direction 136 from the fourth zone 125 to the third zone 120. The second lane 128 may extend through the second portal 114.

Figure 5:
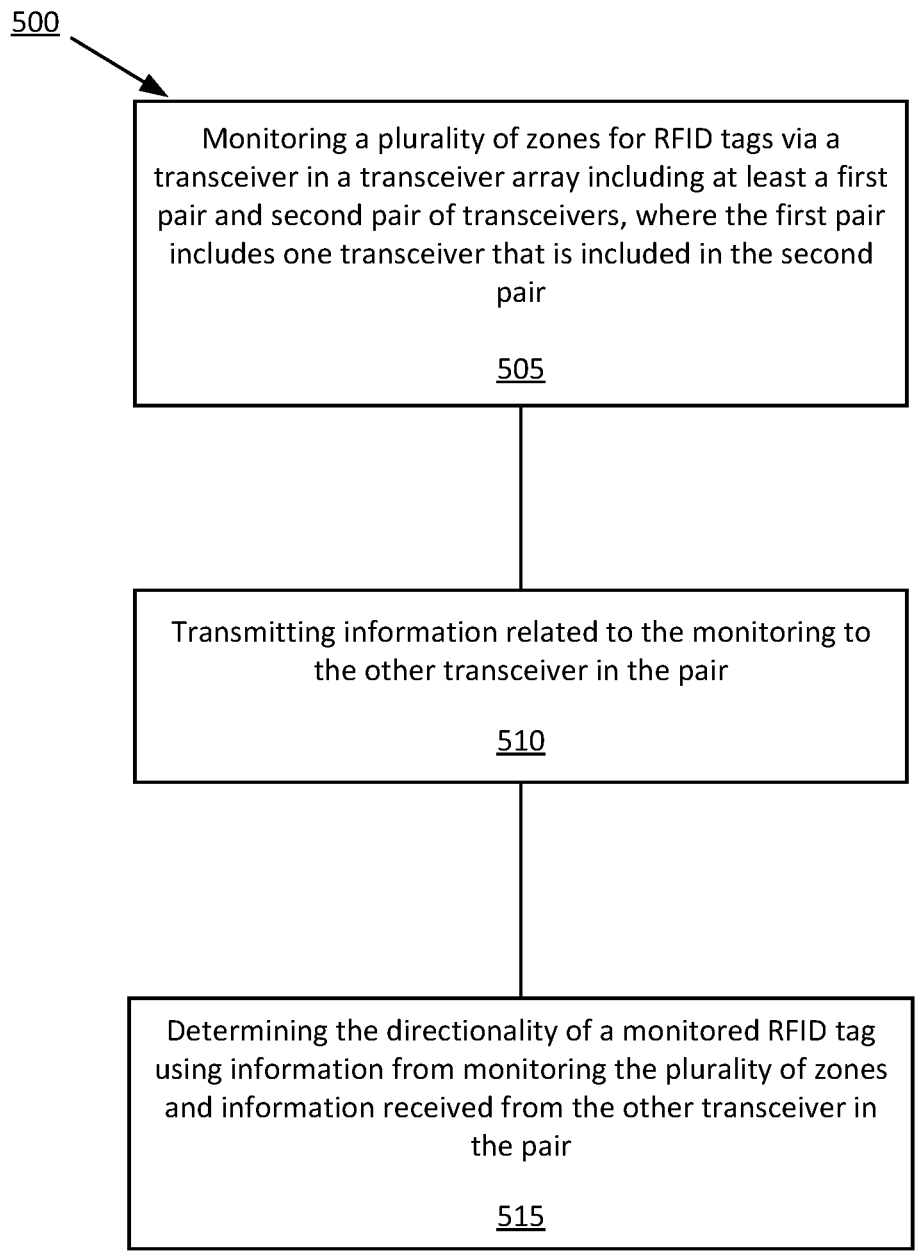
FIG. 5 is a block flowchart of an example embodiment of a method of the present disclosure.

FIG. 5 is a flowchart illustrating a method of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described are optional. The method 500 may be performed by processing logic that may comprise hardware (circuitry, dedicated logic, etc.), software, or a combination of both.

In example method 500, each transceiver in a transceiver array, including at least a first pair of transceivers 103 and a second pair of transceivers 104, the first pair 103 including one transceiver that is also included in the second pair of transceivers 104, monitors a plurality of zones for RFID tags (block 505). For example, transceiver 101b may be included in the both the first pair 103 and second pair of transceivers 104, and transceiver 101b may monitor the first 110, second 115, third 120, and fourth zones 125 for RFID tags.

Example method 500 also includes each transceiver transmitting information related to the monitoring of common zones (block 510). For example, transceiver 101b may detect an RFID tag in the first zone 110 and estimate the bearing of the RFID tag. Transceiver 101b may then transmit that bearing information and other information related to the RFID tag, such as a tag identification number, to transceiver 101*a*, the other transceiver in the first pair, which is also monitoring the first zone.

In example method 500, each transceiver also determines the location of a monitored RFID tag using information from monitoring the plurality of zones and information received from the other transceiver in the pair (block 515). For example, transceiver 101*a* may also detect the same RFID tag in the first zone 110 and estimate the bearing of the RFID tag based on its detections and the bearing estimation/information from transceiver 101*b*, which is then used to determine a location and accurate directionality of a monitored RFID tag.

The present disclosure provides, for example, an efficient system that uses pairs of transceivers that cooperate to coordinate the monitoring and detection of RFID tags in an area and the determination of directionality of a tag based on information from both transceivers in the pair. This results in a more accurate estimate of a tags directionality. Additionally, in busy commercial environments, where large volumes of RFID tags move in and out of portals, a system of the present disclosure provides for multiple diverse reads of a tag's bearing which leads to enhanced accuracy and confidence in determining a tag's location and direction. The coverage overlap and transceiver coordination in a system of the present disclosure also provides extra protection for the system in the event that one transceiver malfunctions by using multiple, diverse reads in the determination of a tag's position and direction.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
a transceiver array, containing at least a first pair of transceivers and a second pair of transceivers, the first pair of transceivers containing a transceiver that is included in the second pair of transceivers, each transceiver in a pair being configured to,
monitor a plurality of zones for RFID tags, each with a defined zone width, including at least a first zone and a second zone, where a first portal is located at a boundary between the first zone and second zone, and including at least a third zone and a fourth zone, where a second portal is located at a boundary between the third zone and fourth zone;
transmit information related to the monitoring of a portion of the plurality of zones for RFID tags to the other transceiver in the pair; and
determine a location of a monitored RFID tag based on the information acquired through the monitoring of the plurality of zones and the information received from the other transceiver in the first or second pair, such that the first pair of transceivers cooperates to monitor and determine locations for RFID tags in the first zone and the second zone, and the second pair of transceivers cooperates to monitor and determine locations for RFID tags in the third zone and the fourth zone.

2. The system of claim 1, wherein each transceiver is further configured to monitor a first lane, which extends in a first direction from the first zone to the second zone, in a second direction from second zone to the first zone, and extends through the first portal, and a second lane, which extends in a third direction from the third zone to the fourth zone, in a fourth direction from fourth zone to the third zone, and extends through the second portal.

3. The system of claim 1, wherein each transceiver is further configured to determine a directionality for a monitored RFID tag based on the information acquired through the monitoring of the plurality of zones by the transceiver and the information received from the other transceiver in the first or second pair.

4. The system of claim 1, wherein the transceiver array is a linear transceiver array.

5. The system of claim 1, wherein each transceiver is a beam steerable phased array RFID reader.

6. The system of claim 1, wherein the first portal and second portal are dock doors.

7. The system of claim 1, wherein each pair of transceivers is further configured to partition the monitoring of zones monitored by both transceivers in the pair.

8. The system of claim 7, wherein the partitioning of the monitoring of zones monitored by both transceivers in the pair comprises one transceiver in the pair monitoring for RFID tags with an even tag identification number and the other transceiver in the pair monitoring for RFID tags with an odd tag identification number.

9. A method for RFID tag reading comprising:
monitoring a plurality of zones for RFID tags via a linear array of transceivers, including at least a first pair of transceivers and a second pair of transceivers, the first pair of transceivers containing a transceiver that is included in the second pair of transceivers, and wherein each transceiver is configured to,
monitor a number of the plurality of zones for RFID tags, each with a defined zone width, including at least a first zone and a second zone, where a first portal is located at a boundary between the first zone and second zone, and including at least a third zone and a fourth zone, where a second portal is located at a boundary between the third zone and fourth zone;
transmitting information related to the monitoring of the portion of the plurality of zones to the to the other transceiver in the pair that monitors the same portion of the plurality of zones;
determining a location of a monitored RFID tag based on the information acquired through the monitoring of the plurality of zones by a transceiver in the first or second pair and the information received from the other transceiver in the first or second pair, wherein the first pair of transceivers cooperates to monitor and determine locations for RFID tags in the first zone and the second zone, and the second pair of transceivers cooperates to monitor and determine locations for RFID tags in the third zone and the fourth zone.

10. The method of claim 9, wherein each transceiver is further configured to monitor a first lane, which extends in a first direction from the first zone to the second zone, in a second direction from second zone to the first zone, and extends through the first portal, and a second lane, which extends in a third direction from the third zone to the fourth zone, in a fourth direction from fourth zone to the third zone, and extends through the second portal.

11. The method of claim 9, wherein determining a location of a monitored RFID tag based on the information acquired through the monitoring of the plurality of zones by a transceiver in the first or second pair and the information received from the other transceiver in the first or second pair further comprises determining a directionality of the monitored RFID tag.

12. The method of claim 9, wherein each transceiver is a beam steerable phased array RFID reader.

13. The method of claim 9 further comprising wherein each pair of transceivers is configured to partition the monitoring of zones monitored by both transceivers in the pair.

14. The method of claim 13, wherein the monitoring of a common zone via a pair of transceivers is split between the transceivers in the pair with one transceiver in the pair monitoring for RFID tags with an even tag identification and the other transceiver in the pair monitoring for RFID tags with an even tag identification number.

* * * * *